United States Patent [19]

Swalheim

[11] Patent Number: 5,718,555
[45] Date of Patent: Feb. 17, 1998

[54] SEED LOADING AND TRANSPORT APPARATUS

[76] Inventor: Duane P. Swalheim, 436 Connie St., Cottage Grove, Wis. 53527

[21] Appl. No.: 726,995

[22] Filed: Oct. 7, 1996

Related U.S. Application Data

[63] Continuation of Ser. No. 453,097, May 30, 1995, abandoned.

[51] Int. Cl.⁶ .................. B60P 1/40; B60P 1/54
[52] U.S. Cl. ............ 414/502; 414/505; 414/523; 414/526; 414/542
[58] Field of Search ............ 414/502, 503, 414/505, 523, 526, 540, 541, 542, 543, 560

[56] References Cited

U.S. PATENT DOCUMENTS

| | | | |
|---|---|---|---|
| 841,465 | 1/1907 | Stauffer | 414/542 |
| 1,521,246 | 12/1924 | Lichtenberg | 414/542 |
| 2,506,930 | 5/1950 | Le Tourneau | 212/95 |
| 2,610,743 | 9/1952 | English et al. | 414/540 X |
| 2,703,227 | 3/1955 | Hughes | 414/502 X |
| 2,959,421 | 11/1960 | Van Der Lely et al. | 414/542 X |
| 2,991,895 | 7/1961 | Dietzenbach | 414/505 |
| 3,021,025 | 2/1962 | Sudenga et al. | 214/522 |
| 3,179,272 | 4/1965 | Goldberger | 414/526 X |
| 3,339,758 | 9/1967 | Hubert et al. | 214/17 |
| 3,391,812 | 7/1968 | Heider | 214/522 |
| 3,473,679 | 10/1969 | Weichel | 414/502 X |
| 3,863,782 | 2/1975 | Sandrock | 414/542 |
| 3,898,786 | 8/1975 | Lundahl | 414/505 X |
| 4,174,740 | 11/1979 | Tobler | 414/505 X |
| 4,194,867 | 3/1980 | Bragg | 414/542 |
| 4,286,530 | 9/1981 | Conley | 414/526 X |
| 4,450,771 | 5/1984 | Theurer et al. | 104/1 R |
| 4,701,095 | 10/1987 | Berryman et al. | 414/505 X |
| 4,742,938 | 5/1988 | Newold | 222/381 |
| 4,930,970 | 6/1990 | Sunderland | 414/542 |
| 5,257,893 | 11/1993 | Sevits | 414/526 X |
| 5,433,520 | 7/1995 | Adams et al. | 414/505 X |
| 5,520,495 | 5/1996 | Sukup | 414/523 |
| 5,529,455 | 6/1996 | Kaster et al. | 414/523 |
| 5,582,221 | 12/1996 | Smith et al. | 414/505 X |

*Primary Examiner*—James W. Keenan
*Attorney, Agent, or Firm*—Hill, Steadman & Simpson

[57] ABSTRACT

An apparatus for loading, transporting and unloading seed is provided. The apparatus has a trailer, an assembly for lifting and carrying a bag of seed removably connected to the trailer, a hopper removably mounted on the trailer, an assembly for dispensing the seed from the hopper to a planter, and a control device for actuating and directing the assembly for loading, lifting and carrying, as well as for regulating the assembly for dispensing the seed.

10 Claims, 14 Drawing Sheets

SEED LOADING AND TRANSPORT APPARATUS

This application is a continuation of application Ser. No. 08/453,097, filed May 30, 1995, now abandoned.

BACKGROUND OF THE INVENTION

1. Field of the Invention

This invention relates generally to farm implements and more specifically to a seed loading, transporting and unloading apparatus.

2. Description of the Related Art

In farming today, it is common to use 50–60 pound bags of seed. For example, seed corn, sorghum, sunflowers, soybeans etc., are all packaged in these bags for shipping and sale to farmers. Commonly, a farmer will order a supply of seed in these bags for the entire field at one time. On a large farm, this can be a substantial number of bags. Usually the bags will be gathered onto a pallet for easier shipping. However, using such a large number of bags is both time consuming and wasteful since the bags must be disposed of after being emptied and cannot usually be used again.

Therefore, a modern trend is emerging wherein the seed to be planted is sold in bulk bags. The benefits of using such a large bag have become very apparent to farmers because of the ease of handling one bag instead of dozens of smaller ones. In addition, the matter of waste is also taken care of since the large bulk bags are reusable. However, because of the vastly increased size, the bulk bags of seed can weigh up to 3,000 pounds. This increased size does have some drawbacks for transporting and dispensing the seed.

Accordingly, a need has arisen for an apparatus and method for loading and transporting bulk bags of seed from stored location or position to a planter in a field.

SUMMARY OF THE INVENTION

It is, therefore, an object of the present invention to provide a seed loading and transporting apparatus capable of transporting and transferring a plurality of bulk bags of seed from a dealer or farmer's storage facility to a planter in a field.

To this end, the present invention provides an apparatus for loading, transporting and unloading seed having a trailer, means for lifting and carrying a bag of seed, a hopper removably mounted on the trailer, means for dispensing the seed from the hopper to a planter and control means for actuating and directing the means for lifting and carrying and for regulating the means for dispensing the seed.

In an embodiment, the apparatus of the present invention provides a superstructure having an I-beam running substantially the length of the trailer and a trolley system operatively connected to the beam. The trolley has a hydraulic lift for lifting and moving the bags of seed.

In an embodiment, the apparatus of the present invention provides a hopper with an auger system for dispensing the seed.

In an embodiment, the apparatus of the present invention further provides a first auger motor and a second auger motor on the auger system.

The present invention also provides a method for loading, transporting and unloading bags of seed. The method has steps of lifting and carrying at least one bag of seed onto a trailer. The seed bags are lifted by connecting a bag grabber to the bag of seed located off the back end of the trailer. The bag grabber is positioned over the bag and connected to the bag seed. The bag of seed is then lifted vertically and transported horizontally onto the trailer. Preferably, the bag of seed is located onto a hopper having a dispensing device for unloading the seed from the hopper into a planter.

In an embodiment, the method of the present invention further has a step of emptying the unloading auger into the planter with a seed remaining in the hopper auger.

An advantage of the present invention is to provide an automated apparatus for loading, transporting and dispensing seed stored in bulk bags.

Another advantage of the present invention is to provide an apparatus having a capability for transporting a plurality of bulk bags of seed.

A further advantage of the present invention is to provide an apparatus having lifting and carrying means to pick up bags from a storage facility and load them unto a trailer to transport them to a field in which a planter will be used to plant the seed.

DETAILED DESCRIPTION OF THE PREFERRED EMBODIMENTS

Figures 1, 15A:
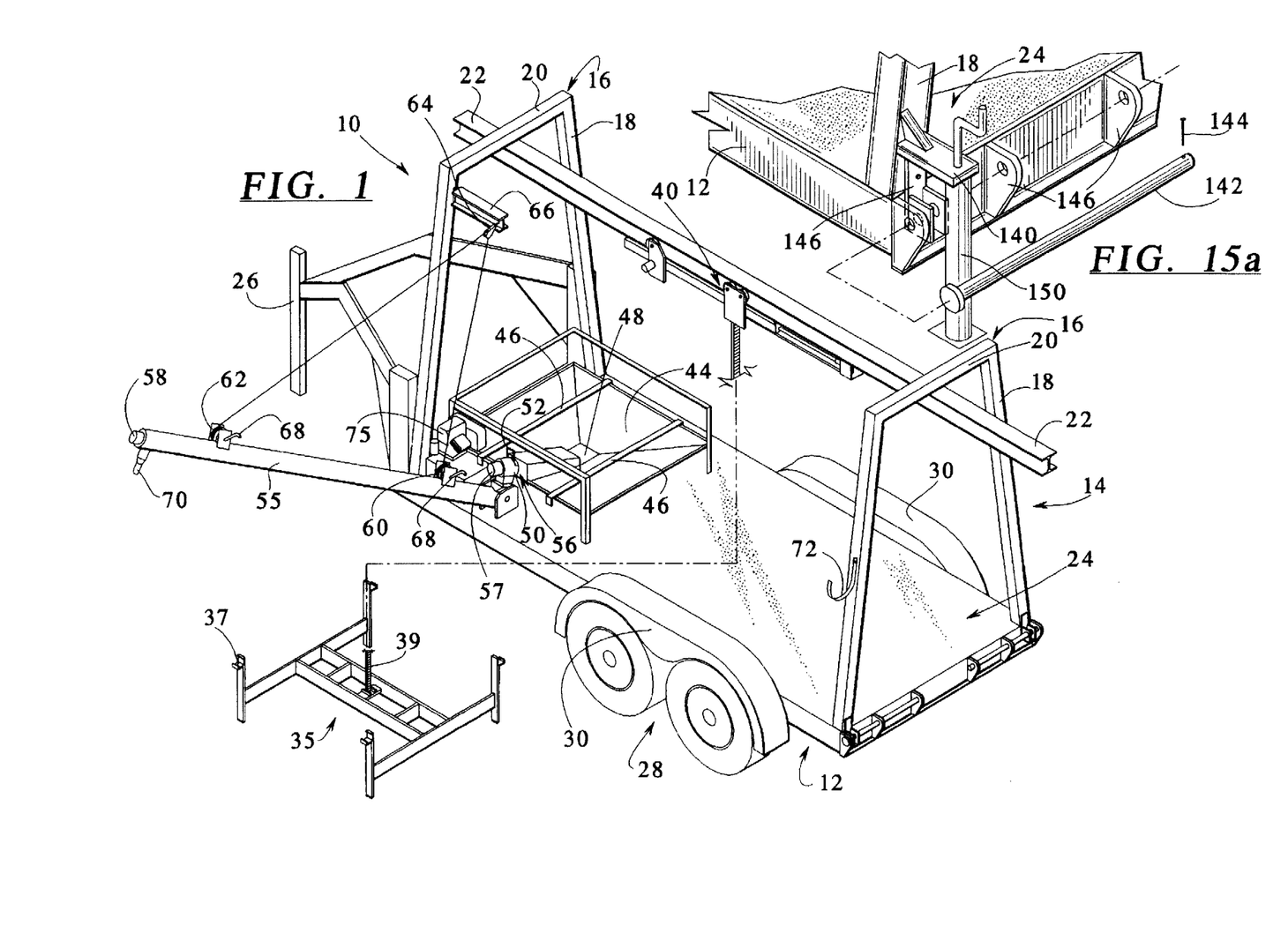
FIG. 1 is a perspective view of the new and improved seed loading, transporting and unloading apparatus of the present invention.
FIG. 15a illustrates a detail view of the interface between the trailer and superstructure of an embodiment of the present invention in a connected state.

A preferred embodiment of the present invention is illustrated in FIG. 1. A seed loader and transport apparatus 10 is shown in perspective view. The seed loader 10 comprises a standard type trailer 12 having a superstructure 14 mounted thereon for loading large bags of seed, i.e. approximately bulk capacity. The superstructure 14 consists of at least two arches 16, each having two vertical members 18 and a horizontal member 20. An I-beam 22 is rigidly connected to the horizontal member 20 of the arch 16 at each end of the superstructure 14.

FIG. 1 also illustrates other basic features of the trailer 12. For example, the trailer 12 has a flat bed portion 24 on which the bulk bags of seed can be transported. Also, near the front of the trailer 12 is a trailer hitch 26. The trailer hitch 26 can be used to attach the trailer 12 to a pickup or other towing vehicle (not shown). The trailer 12 illustrated also has a tandem axle 28. The tandem axle 28 provides for a greater total carrying weight capacity on the trailer 12. Fenders 30 may be provided to cover the tandem axle 28 for safety.

Also illustrated in FIG. 1 is a bag grabber 35. The bag grabber 35 has a plurality of bag grabber hooks 37 for cooperating with the bulk seed bags. Also shown is a lifting chain 39 which connects the bag grabber 35 to a trolley system 40. The trolley system 40 is shown in greater detail in FIG. 7 and will be described below with reference thereto.

In addition, a hopper 44 is shown mounted to the bed 24 of the trailer 12. The hopper 44 has safety bars 46 surrounding the periphery of the hopper 44. The hopper 44 also has a hopper opening 48 at the bottom thereof for dispensing the seed from the bulk bag. To control the flow of the seed through the hopper opening 48, the hopper 44 has a retractable and adjustable closing sleeve 50 with a handle 52 for activating the sleeve 50. This feature will be described below with reference to FIG. 8.

Figure 9:
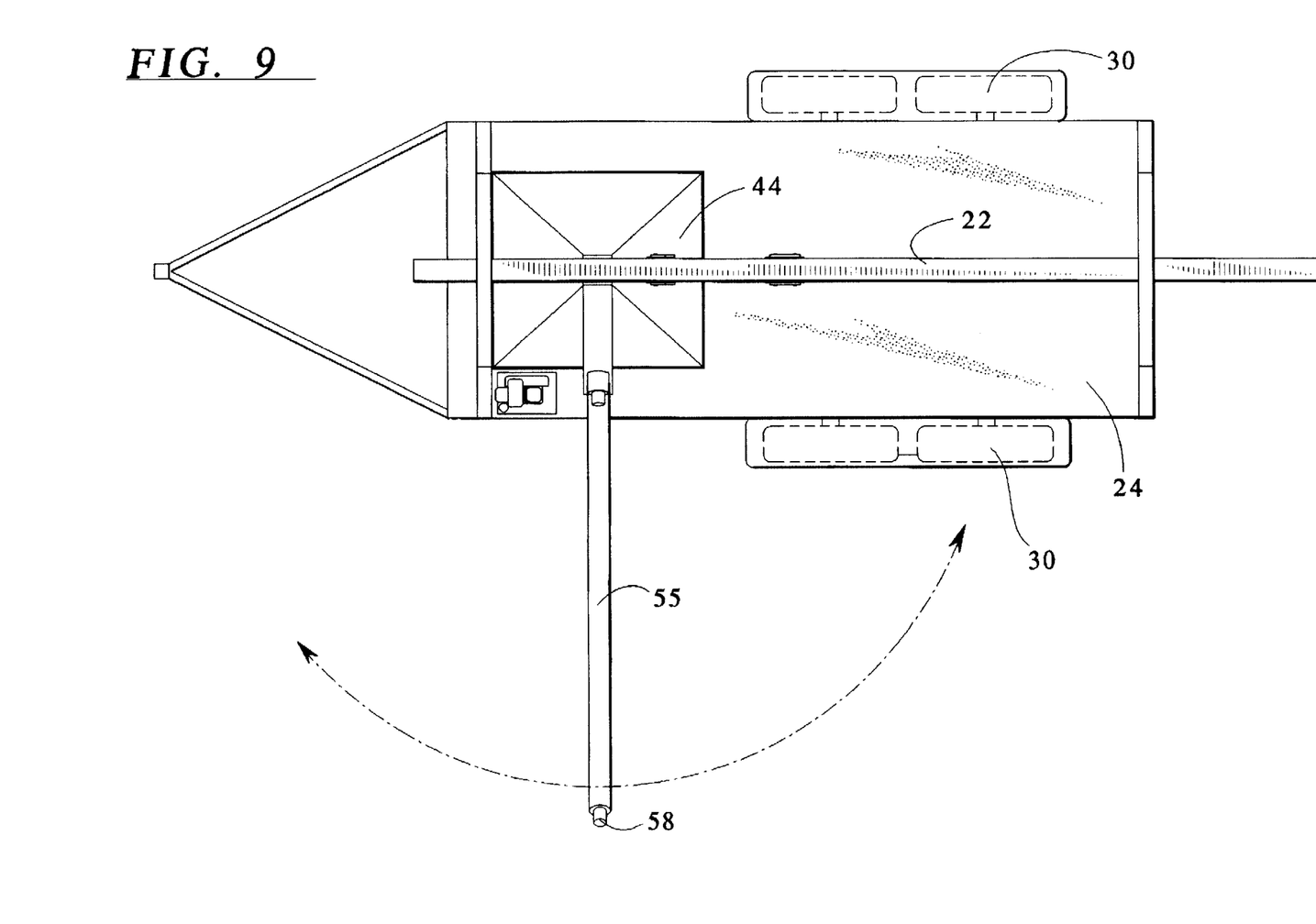
FIG. 9 is a top plan view of an embodiment of the new and improved seed loading, transporting and unloading apparatus in accordance with the present invention wherein a swing radius of an auger is shown.
Figure 10:
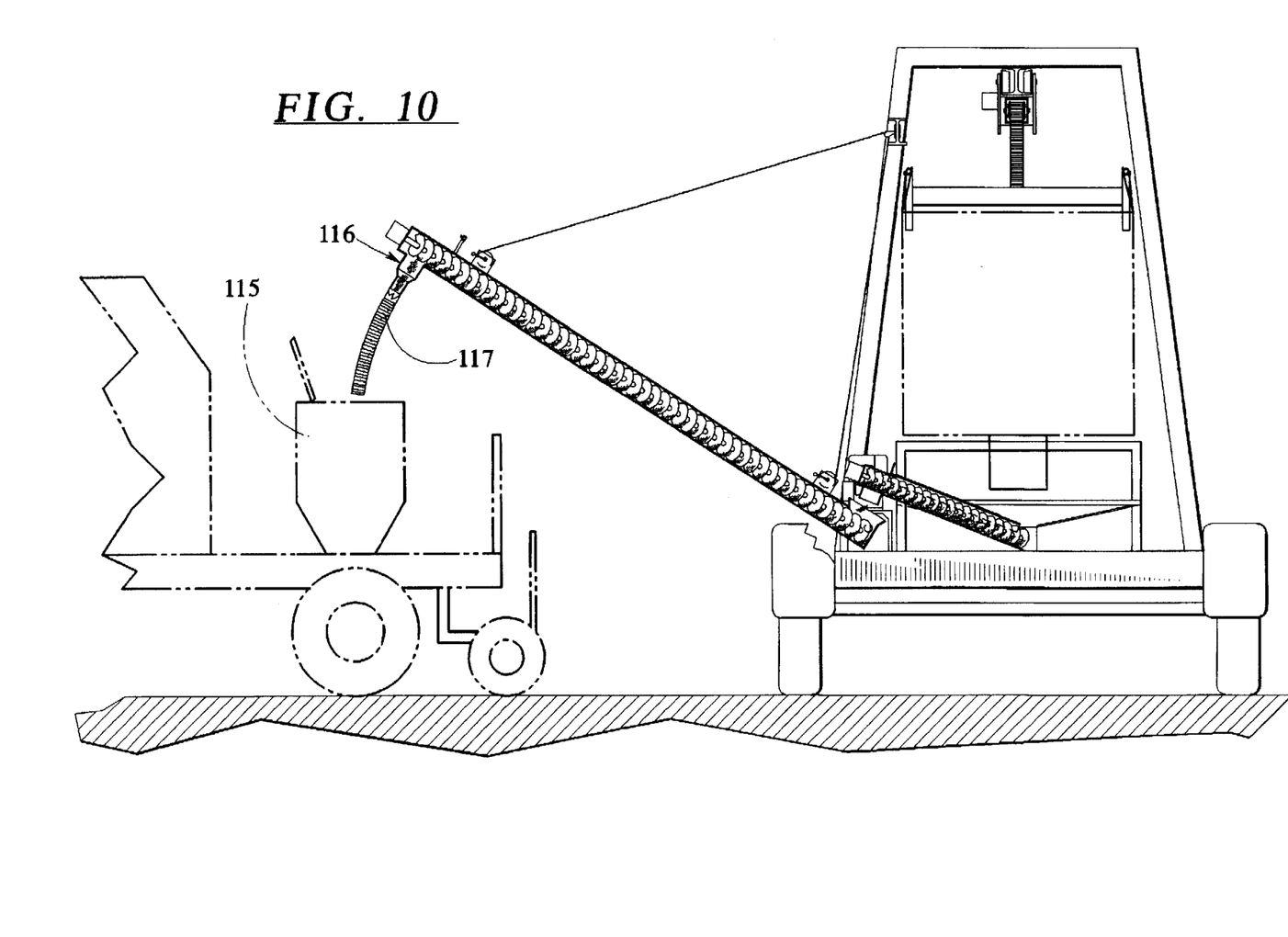
FIG. 10 is a rear end elevation view partly in section of a new and improved seed loading, transporting and unloading apparatus in accordance with the present invention wherein an auger is positioned above a planter for unloading the seed therein.

Also illustrated in FIG. 1 is a means for dispensing seed from the hopper 44 to a planter (see FIG. 10). In a preferred embodiment, the dispensing means comprises an unloading auger 55 and a hopper auger 56. The unloading auger 55 has a first auger motor 57, and a second auger motor 58. To properly position the unloading auger 55 above a planter, FIG. 1 illustrates that the present invention also has a first winch 60 and a second winch 62 connected via a pulley 64 which is mounted to a pulley support 66. Each winch 60, 62 can be adjusted by a handle 68 on either winch 60, 62. Once the unloading auger 55 is in position, the seed is dispensed through a downspout 70. The unloading auger 55 also has a range of motion as shown in FIG. 9 and discussed below. In addition, an auger hook 72 is connected to the rear vertical member 18 of the arch 14 for storage when the trailer 12 is in motion. Also, a motor 75 for operating hydraulics on the trailer 12 is shown.

A method of loading and transporting bulk seed bags is illustrated in FIGS. 2–6 with reference to a preferred embodiment of the seed loading and transport apparatus described above with reference to FIG. 1. The steps of the method of loading and transporting bulk bags of seed are described as follows.

Figure 2:
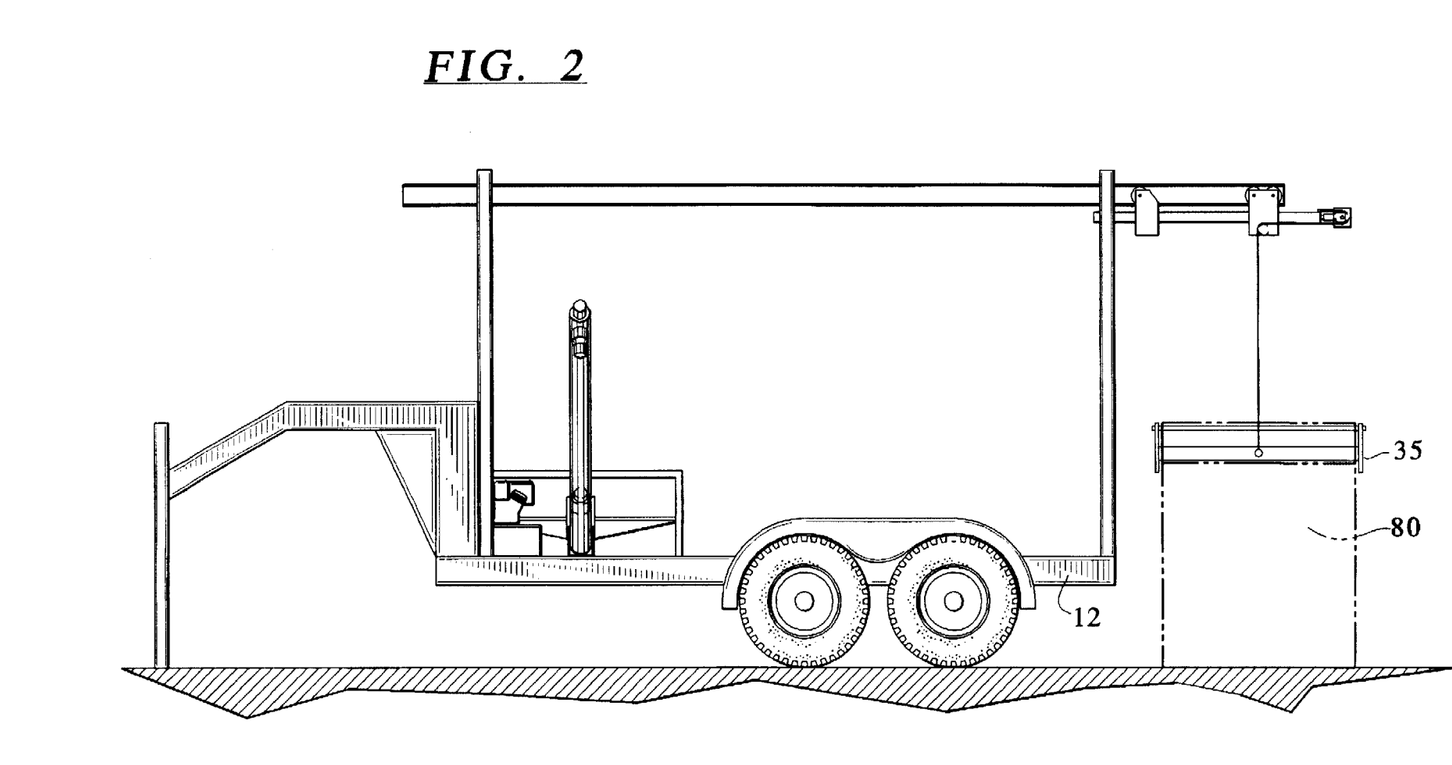
FIG. 2 is a side elevation view of the new and improved seed loading, transporting and unloading apparatus showing a first stage of loading a seed bag onto the new and improved apparatus wherein a bag is located adjacent to the rear of the apparatus.

FIG. 2 illustrates the initial position for operating a preferred embodiment of the apparatus of the present invention. First, a user backs the trailer 12 up to a bag 80 in a stored position. The bulk bag 80 is thus located near the rear of the trailer 12. The trolley system 40 is cantilevered over the bag 80 and so that it is beyond the rear of the trailer 12, yet remains on the I-beam 22 such that the bag grabber 35 can be positioned directly above the bulk seed bag 80. The bag grabber hooks 37 are used in conjunction with a pair of rods 85 to secure the bag 80 to the bag grabber 35. Thus, at this point, the trolley system 40 is cantilevered off the back of the trailer 12 and the bag grabber 35 is connected to the bag 80, and the user has completed the first step of loading the bag 80. Although FIG. 2 illustrates the initial position for operating a preferred embodiment of the apparatus of the present invention having a seed bag located at the rear end of the trailer 12, it is the intention of the inventor to not limit the invention to only be operable when the bag is located at the rear of the trailer 12. Thus, the inventor intends that the invention also be capable of lifting and loading bags of seed that are located to the side of the trailer, for example.

Figure 3:
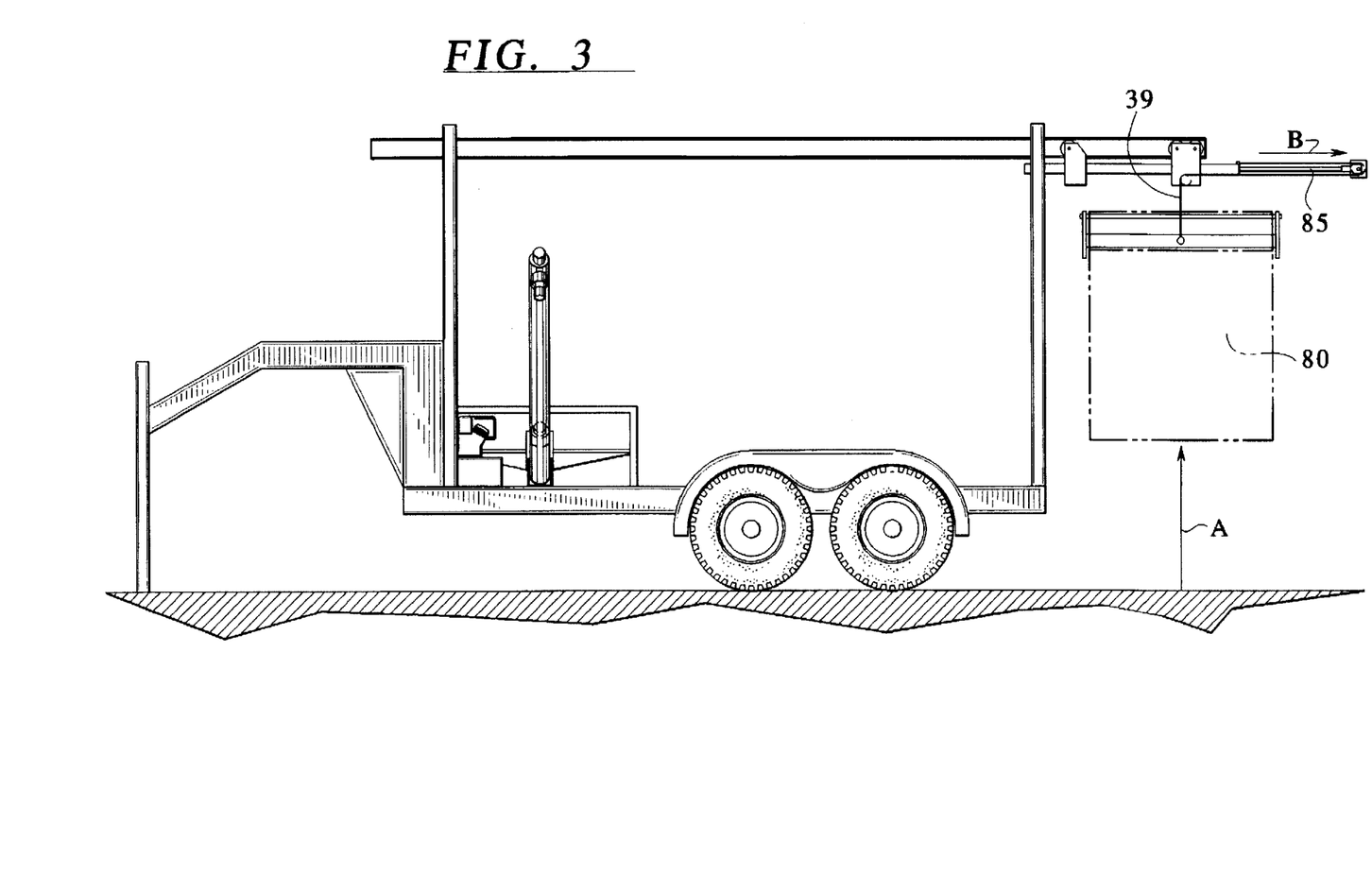
FIG. 3 is a side elevation view of the new and improved seed loading, transporting and unloading apparatus showing a second stage of loading a bag of seed onto the apparatus wherein the bag of seed is lifted with the lifter connected to the translator of the new and improved apparatus of the present invention.

Referring now to FIG. 3, an embodiment of the present invention diagrammatically shows the movement of the bag 80 during a lifting operation. For example, as shown by arrows indicating movement, arrow A indicates that the bag 80 is lifted off the ground by the bag grabber 35 and the trolley system 40. Arrow B indicates that a rod 85 of the trolley system 40 is extended in the direction of arrow B to provide for the lifting of the bag 80. This is done by effectively shortening the vertical portion of the lifting chain 39 by horizontally extending the rod 85 of the trolley system 40. Since the lifting chain 39 has finite length, the extension of the rod 85 in the horizontal direction of arrow B corresponds to a directly proportional increase in the vertical movement of the bag 80 in the direction of arrow A.

Figure 4:
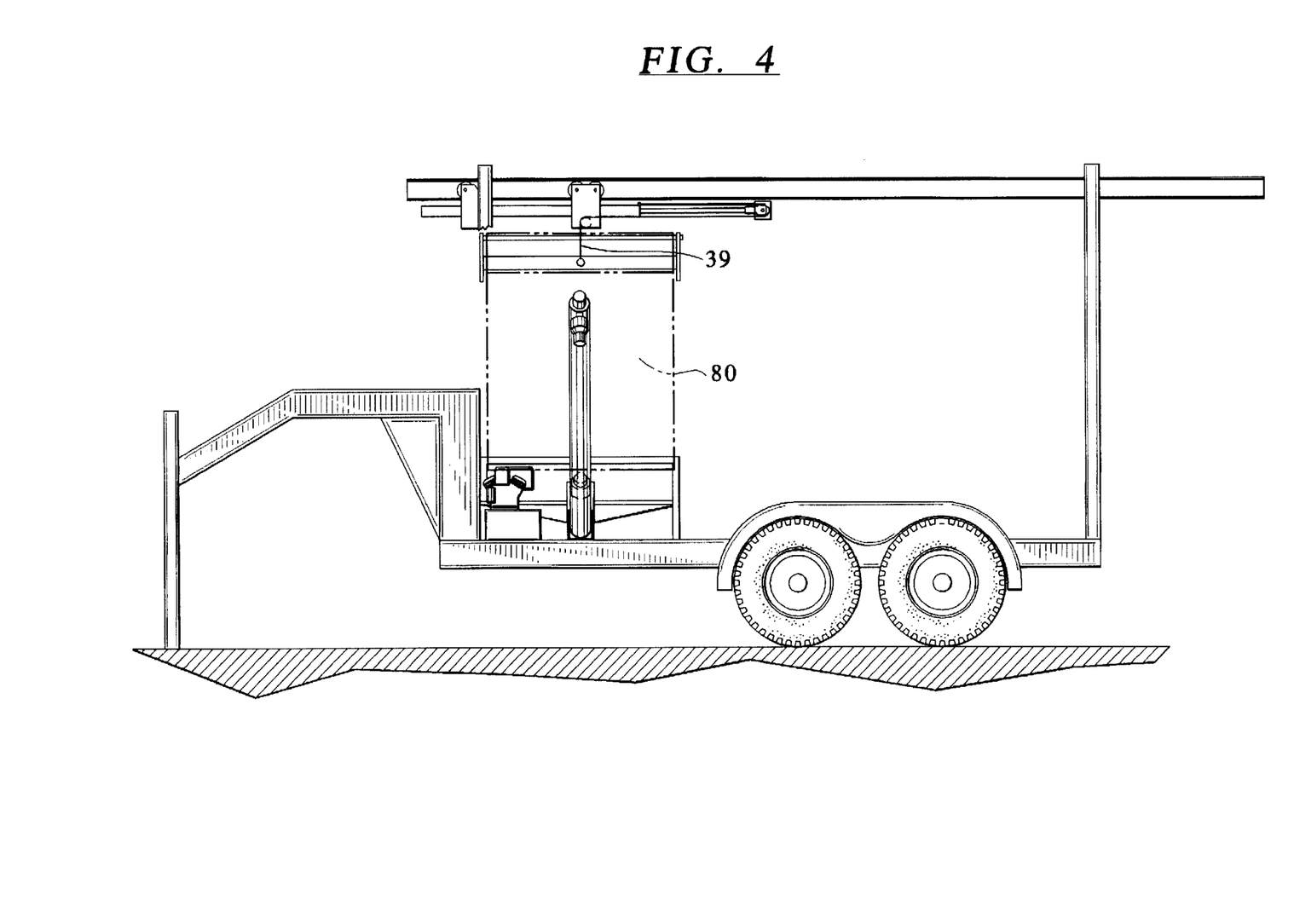
FIG. 4 is a side elevation view of the new and improved seed loading, transporting and unloading apparatus showing a third step of loading a bag onto the apparatus wherein the bag is transported and located above a hopper in accordance with the principles of the present invention.

Once the bag 80 is lifted off the ground behind the trailer 12, the trolley system 40 is used to transport the bag grabber 35 and bag 80 to the front of the trailer 12 so that the bag 80 is positioned directly above the hopper 44. This positioning is shown in FIG. 4. Usually, the bag 80 is loaded onto the hopper 44 so that at least two other bags can be loaded onto the trailer 12.

Figure 5:
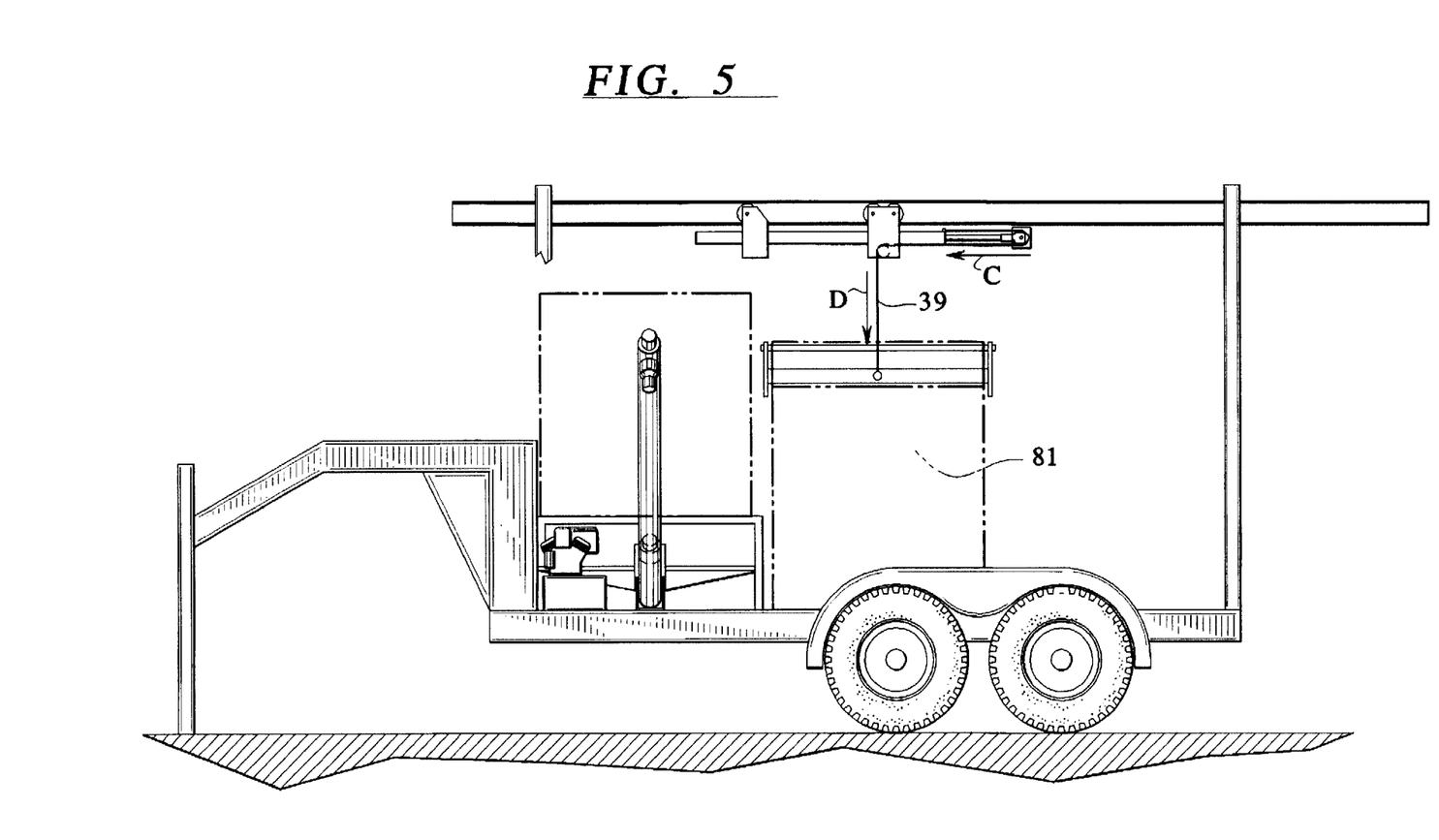
FIG. 5 is a side elevation view of the new and improved seed loading, transporting and unloading apparatus showing a second bag of seed being loaded onto the new and improved apparatus of the present invention wherein the second bag is placed onto a storage area on a trailer bed.

FIG. 5 illustrates, in a similar fashion to the steps shown in FIGS. 2, 3 and 4, how a second bulk bag 81 is loaded onto the trailer 12. In FIG. 5, the second bag 81 is shown placed on the flat bed 24 of the trailer 12. Arrow C indicates that the trolley rod 85 of the trolley system 40 is shortened in the direction of arrow C so that the lifting chain 39 is effectively lengthened in the direction of the arrow D. This allows the transported second bag 81 to be loaded onto the flat bed 24 of the trailer 12.

Figure 6:
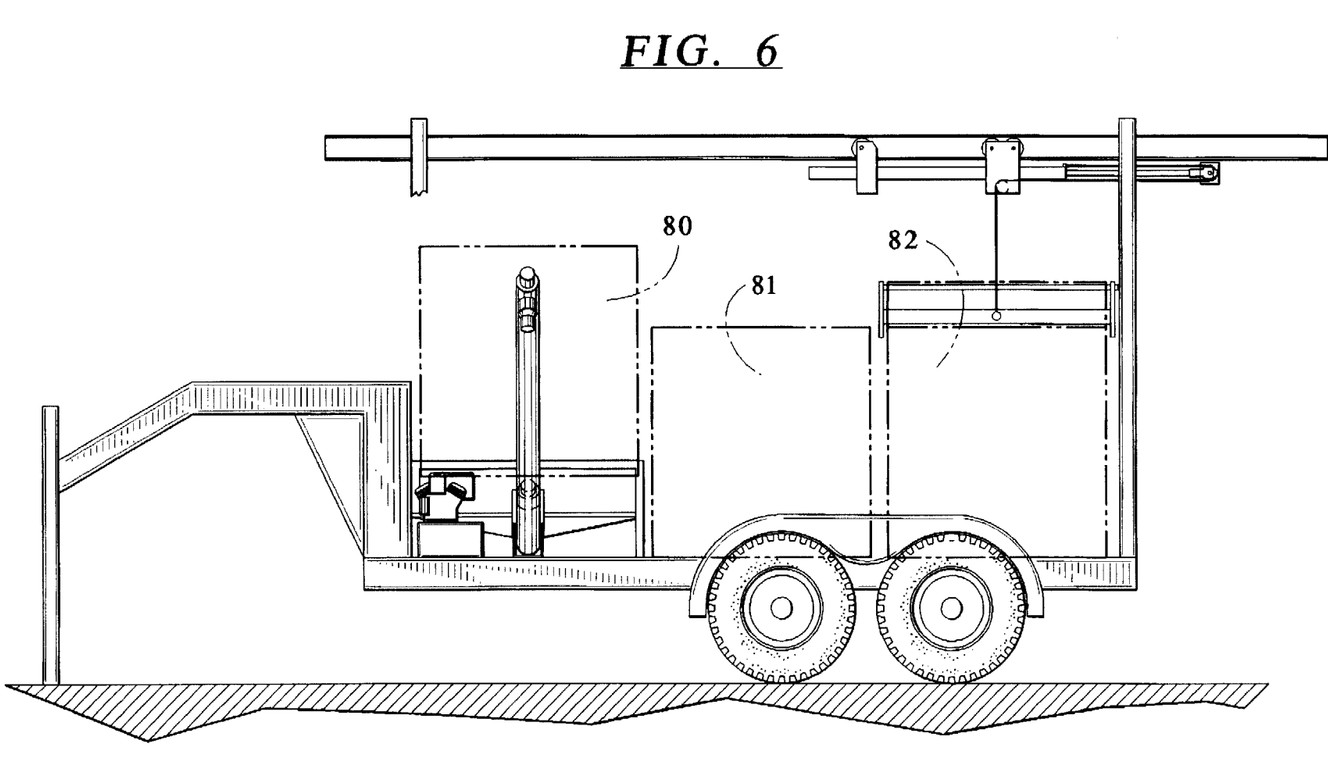
FIG. 6 is a side elevation view of the new and improved seed loading, transporting and unloading apparatus of the present invention wherein the second bag is placed onto the storage area of the trailer bed.

FIG. 6 illustrates the apparatus of the present invention with an additional third seed bag 82 located on the flat bed portion 24 of the trailer 12. Thus, as a result of the above discussed steps, the method of loading three bulk bags 80, 81, 82 for transport to the planter in the field is thus accomplished.

A more detailed explanation of the trolley system 40 and the bag grabber 35 is discussed with reference to FIG. 7. The trolley system 40 manipulates the lifting chain 39 which is connected to the bag grabber 35. The bag grabber lifting chain 39 travels over an intermediate pulley 87 and an end pulley 90. The trolley system 40 runs on a plurality of wheels 92 and a second set of wheels 94 located near the ends of the trolley system 40. In a preferred embodiment, the trolley system 40 is controlled hydraulically in a conventional manner by using the motor 75 and by means of a trolley control panel 95 connected to the trolley system 40 by a control cable 96. The trolley control panel 95 has a plurality of control buttons 97 to control the up/down and fore/aft movement of the bags 80, 81, 82 being transported. The trolley control panel 95 is also connected to a fore/aft motor 98 to provide the fore/aft movement. As explained above, the up/down movement is controlled and provided by hydraulically extending and retracting the rod 85 to change the effective length of the lifting chain 39. In another embodiment, the trolley system 40 and the bag grabber 35 may be manually actuated by the user. Such an embodiment avoids certain mechanical complexities and provides a simple, reliable machine. The manually actuated trolley system controls the up/down and fore/aft movement of the bags 80, 81, 82. Of course, other types of actuation for the trolley system 40 are possible to one skilled in the art.

Figures 7, 8:
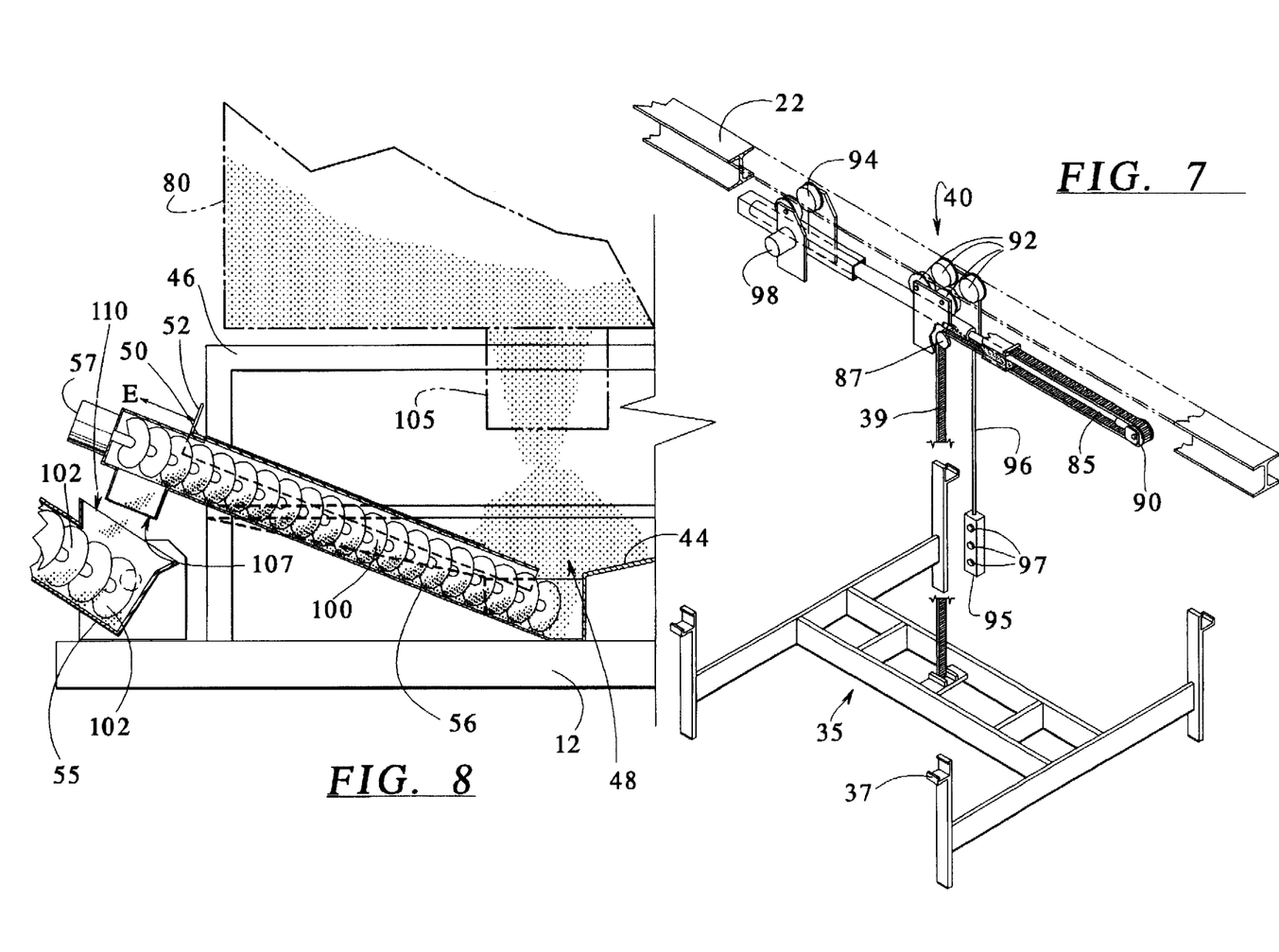
FIG. 7 is an exploded perspective view with portions of a transport beam cut away showing the bag grabber and lifter in accordance with the preferred embodiment of the present invention.
FIG. 8 is a side elevation view in cut-away showing a portion of the hopper of the present invention and the seed mover wherein the seed mover comprises a first and second auger in accordance with the present invention.

Now referring to a detailed view of the hopper 44 and hopper auger 56 of the present invention as illustrated in FIG. 8, the hopper 44 has safety bars 46 located on the trailer 12. In a preferred embodiment, the hopper auger 56 has a hopper auger screw 100 and the unloading auger 55 has an unloading auger screw 102. As illustrated in FIG. 8, a bag 80 having a releasable opening 105 is positioned on the hopper 44 so that the seed can be emptied from the bag 80 into the hopper 44. By gravity, the seed is fed through the hopper opening 48. The hopper auger screw 100 can then draw the seed up to the hopper auger outlet 107. The seed is then emptied from the hopper auger outlet 107 to the unloading auger screw 102 located in the unloading auger 55. The seed enters the unloading auger 55 through an inlet port 110. Also as illustrated in FIG. 8, by grabbing the handle 52 of the closing sleeve 50 and pulling in either direction indicated by arrow E, the hopper opening 48 can be opened or closed to allow more or less seed to enter the hopper auger screw 100.

FIG. 9 illustrates the range and degree of motion capability of the unloading auger 55 for loading seed into a planter. The planter can be positioned near the seed loading and transport apparatus 10, but the location is not critical because of the flexibility of movement of the unloading auger 55.

FIG. 10 illustrates an embodiment of the present invention utilizing the method of the invention to load seed into a planter 115. As in the embodiment illustrated, an end 116 of the unloading auger 55 is provided with a flexible hose 117 to allow greater flexibility in dispensing the seed into the planter 115. The flexible hose 117 can be directed by the user to separately and precisely load different bins of the planter 115.

Figure 11:
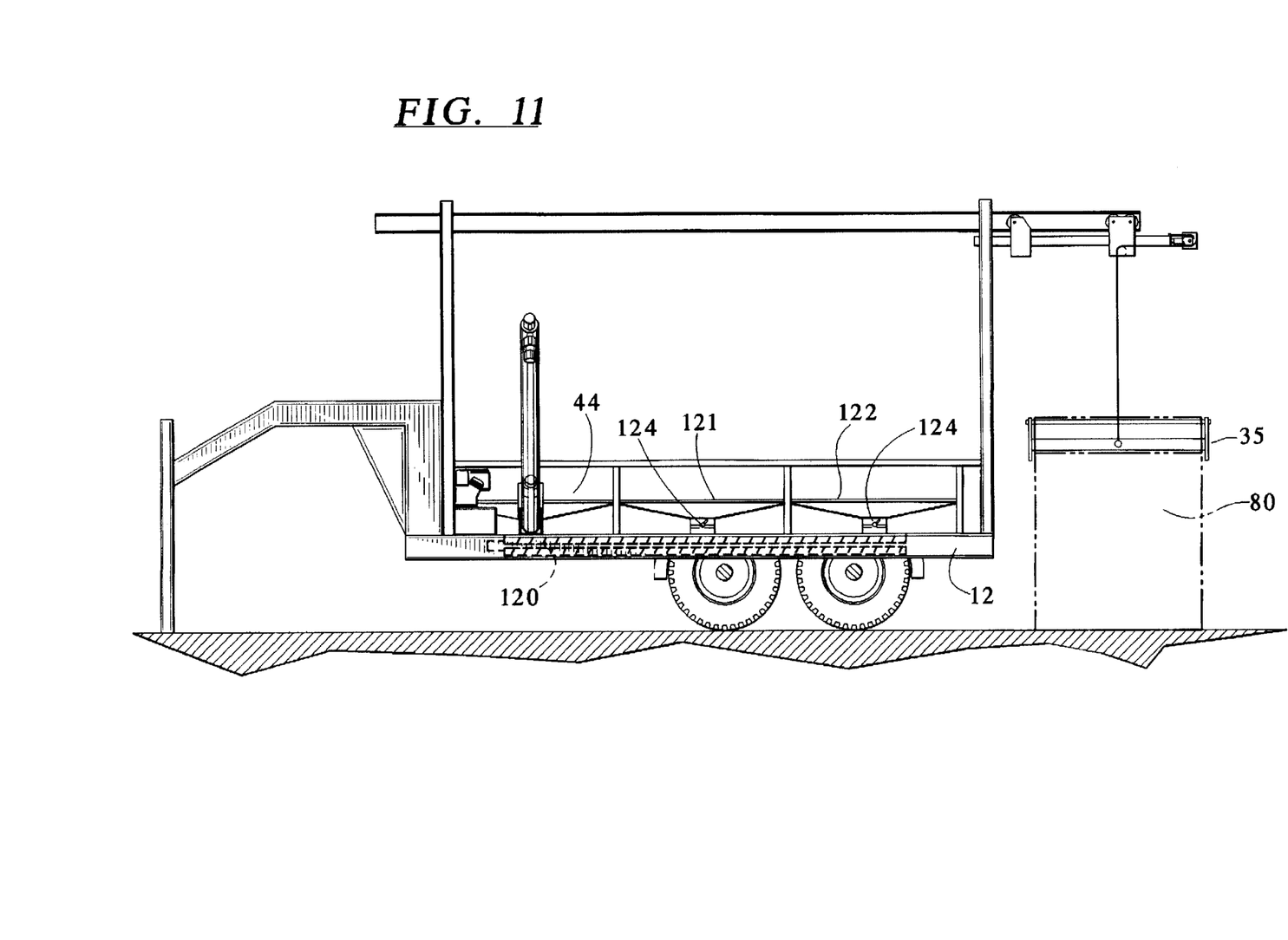
FIG. 11 is a side elevation view of a new and improved seed loading, transporting and unloading apparatus partly in section to reveal an embedded transport screw connecting a plurality of hoppers and a bag of seed off the rear end of the trailer connected to the bag lifter and grabber means cantilevered off the transport beam.

FIG. 11 illustrates another embodiment of the present invention in which a plurality of hoppers are provided. In this embodiment, three hoppers are located adjacent to each other along the length of the trailer bed 24. The apparatus in this embodiment of the present invention is operated similarly to the first one described above. However, an additional auger screw 120 is embedded into the trailer bed 24 for transporting seed from a second hopper 121 and/or a third hopper 122 to the unloading auger 55 located on the first hopper 44. In addition, shut-off valves 124 are provided on the second hopper 121 and the third hopper 122 to control which hopper actually dispenses seed into the embedded auger screw 120.

Figure 12:
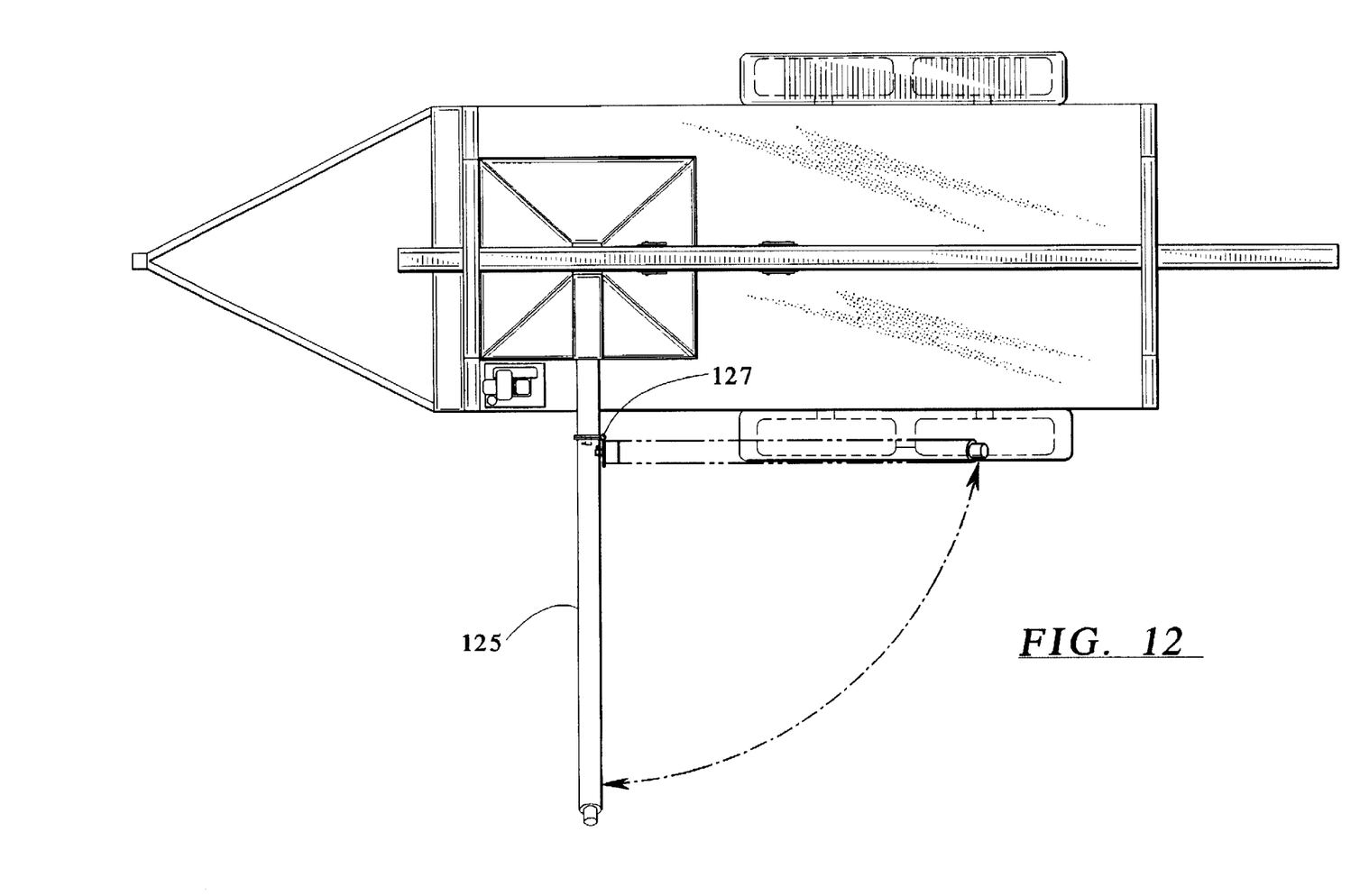
FIG. 12 is a top plan view of an alternative embodiment of the new and improved apparatus for loading, transporting and unloading bags of seed wherein the auger includes a hinge mechanism and wherein the auger is also shown in phantom view rotated about the hinge mechanism for storage during transport of the trailer.

FIG. 12 illustrates another embodiment of the present invention having a hinged auger 125. The hinged auger 125 has a hinge 127 located near the edge of the trailer 12. This hinge 127 allows the auger 125 to be stowed during transportation and movement of the trailer 12.

Figure 13:
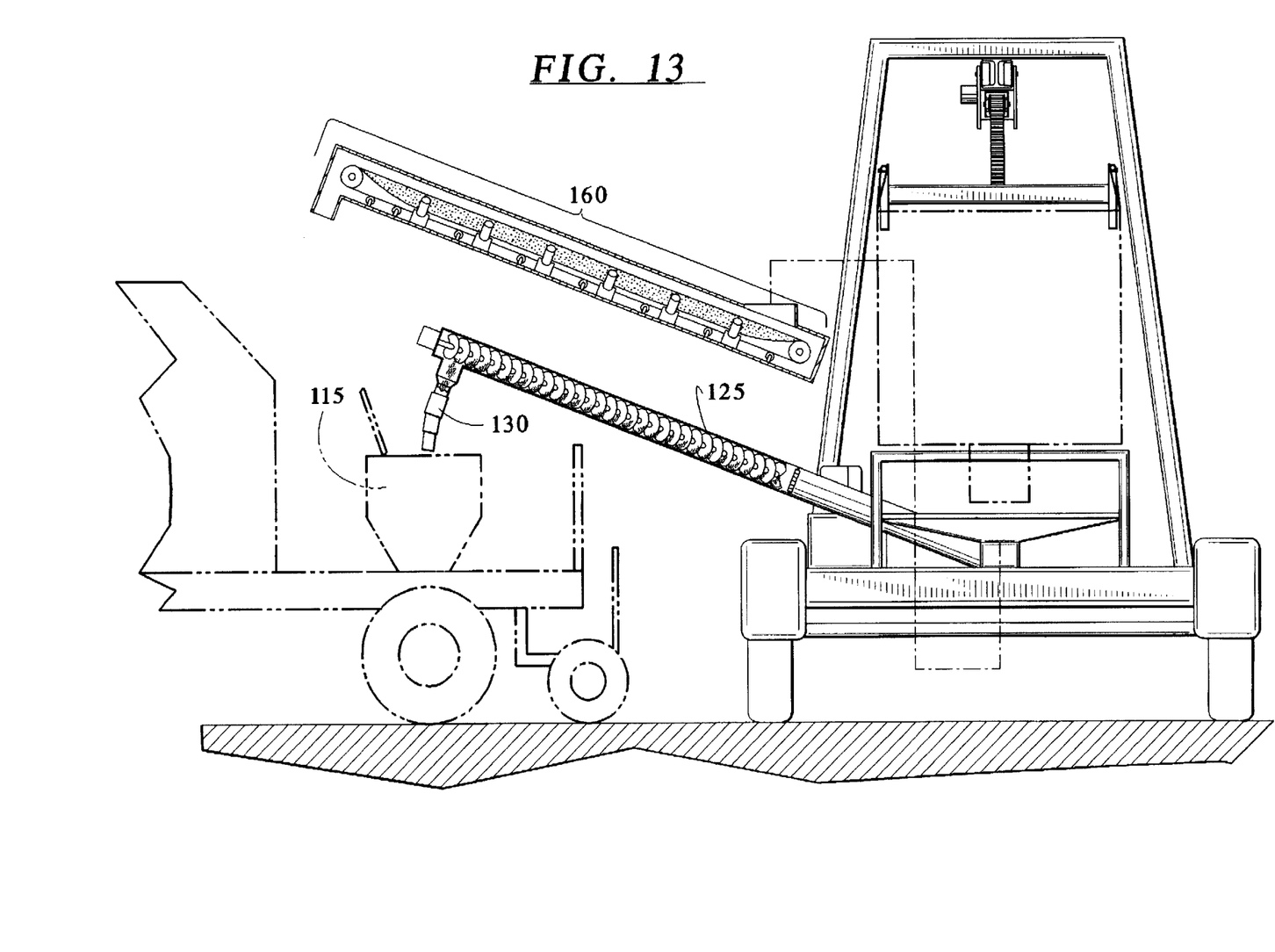
FIG. 13 is a rear end elevation view partly in section of a new and improved seed loading, transporting and unloading apparatus in accordance with the present invention as shown in FIG. 12 wherein an auger is positioned above a planter for unloading the seed thereinto.

FIG. 13 illustrates the operation of the embodiment of the invention illustrated in FIG. 12. The hinged auger 125 is shown performing the step of unloading seed into the planter 115. Another embodiment of a dispensing tube 130 is illustrated in this embodiment. The dispensing tube 130 preferably comprises concentric PVC pipes each having a smaller diameter than the adjacent pipe. In another embodiment of the present invention, a belt conveyor is provided to dispense the seed from the hopper 44 to the planter 115. Of course, one skilled in the art may use other types of seed dispensing devices in the present invention. An alternative seed dispensing device, for example, is a belt conveyor 160. The belt conveyor 160 can equally connect into the hopper 44 to dispense seed therefrom.

Figure 14:
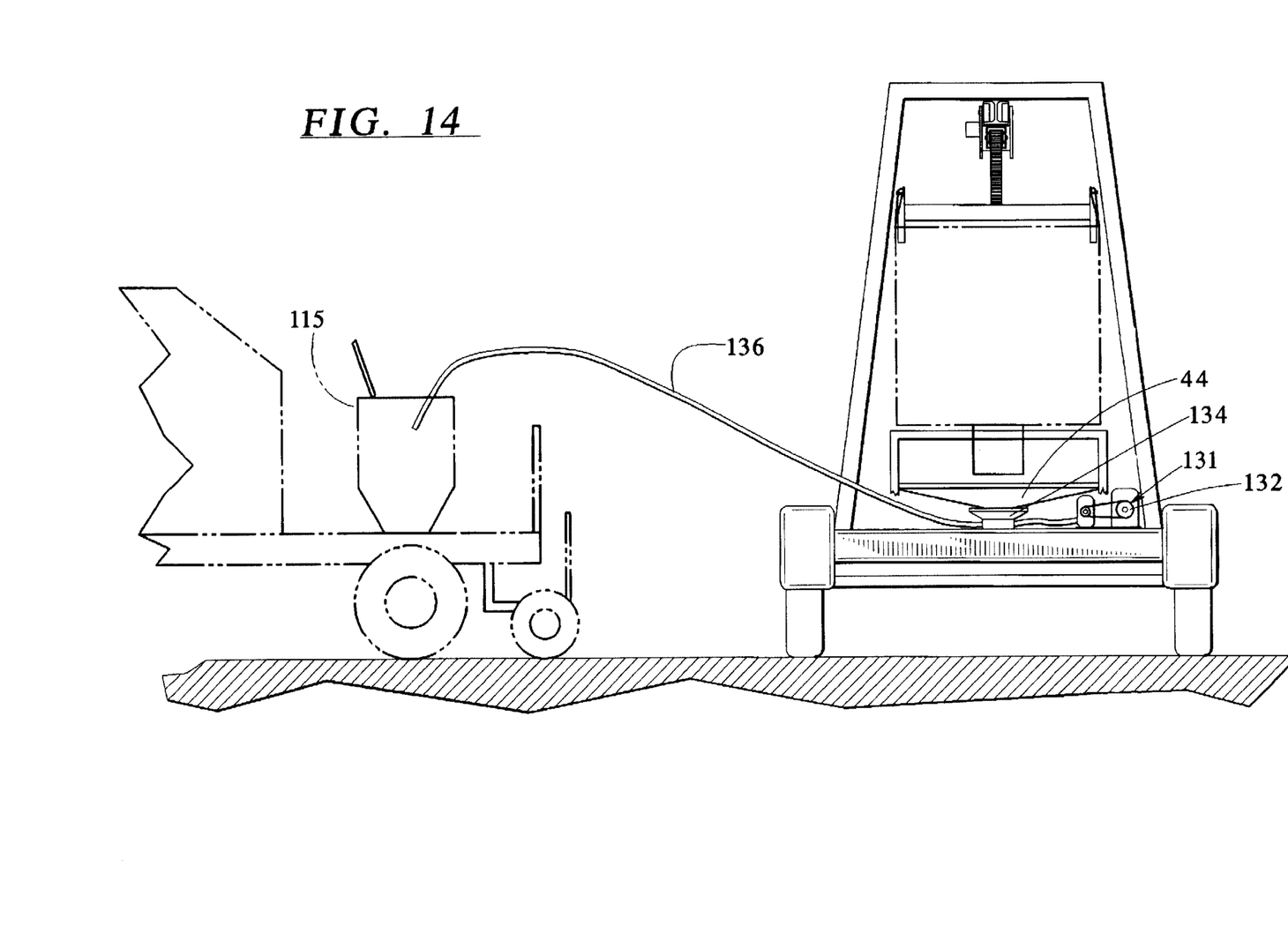
FIG. 14 is a rear end elevation view partly in section of an alternate embodiment of a new and improved seed loading, transporting and unloading apparatus in accordance with the present invention wherein an air delivery system for dispensing the seed is mounted to the trailer and a delivery hose is positioned above a planter for unloading the seed thereinto.

FIG. 14 illustrates a further embodiment of the present invention in which an air delivery system 131 is mounted to the flat bed 24 of the trailer 12. The air delivery system 131 is provided for dispensing the seed into the planter 115. The air dispensing system 130 comprises a motor unit 132 and an air lock device 134 located underneath a hopper 44 for providing sufficient vacuum air pressure to transport the seed by the air generated by the motor 132. The seed is then transported to the planter 115 through a stainless steel hose 136 in a preferred embodiment.

Figure 15B:
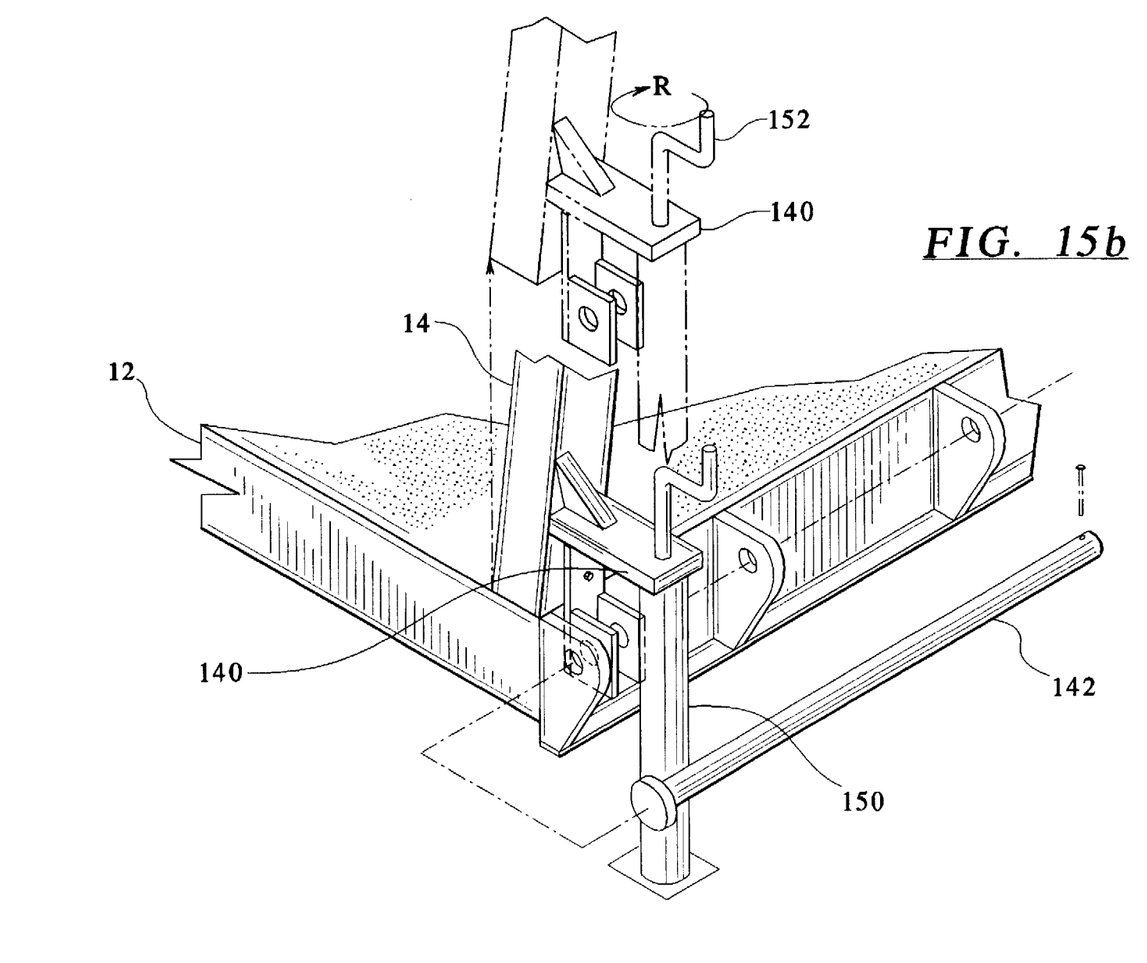
FIG. 15b illustrates a detail view of the interface between the trailer and superstructure of an embodiment of the present invention in a disconnected state, wherein the superstructure is shown in dashed lines raised off the trailer by a jack.

FIG. 15a illustrates a detailed view of an interface between the trailer and superstructure of an embodiment of the present invention. It is preferred in all the embodiments described above that the superstructure 14 of the present invention be removable from the trailer 12 so that the trailer 12 can be used for other tasks on the farm. To accomplish this removal of the superstructure 14 in a simple manner, an embodiment of the present invention provides a jack plate 140 located on each vertical member 18 of the rear arch 16. In addition, a connecting pin 142 having, for example, a cotter key 144 is also provided. The rod 142 can be removed from a connecting structure 146 as shown by the dashed lines in FIG. 15a so that the rear vertical members 18 of the arch 14 can be raised above the flat bed 24 of the trailer 12. FIG. 15b illustrates the same elements of the superstructure 14 and the trailer 12. However FIG. 15b illustrates, in dashed lines, the superstructure 14 raised off of the trailer 12. This is accomplished by rotating a trailer jack arm 152 in a direction indicated by arrow R. This is done by placing a jack 150 (shown in dashed lines) beneath each of the jack plates 140 and raising the jacks 150 so that the rear vertical members 18 are suspended above the flat bed 24 of the trailer 12. Performing a similar operation on the front arch 16 provides that the sperstructure 14 will be raised above the flat bed 24 of the trailer 12. The user can then pull the trailer 12 via the trailer hitch 26 ahead so that the trailer 12 is pulled clear from beneath the superstructure 14. The jacks 150 can then be lowered so that the superstructure 14 rests on the ground and in a desired location on the farm for storage until it is reconnected for use the next planting season.

The present invention is subject to many variations, modifications and changes in detail. It is intended that all matter described throughout the specific and shown in the accompanying drawings be considered illustrative only. Accordingly, it is intended that the invention be limited only by the spirit and scope of the appended claims.

I claim:

1. An apparatus for loading, transporting and unloading bags of seed, said apparatus comprising:

a movable trailer including a generally horizontal trailer bed having a front end and an opposed rear end;

a frame superstructure removably mounted on the trailer including a forward arch and a rearward arch disposed adjacent the front end and the rear end of said trailer bed respectively, said forward arch and said rearward arch each including a pair of depending spaced apart vertical legs connected by an upper horizontal member, said frame superstructure further including at least one elongated transport beam including a forward portion extending between and interconnecting the upper horizontal members of the forward arch and the rearward arch disposed in spaced overlying relation to the trailer bed and a rearward portion extending outwardly rearwardly from the rearward arch and the rear end of the trailer bed, each vertical leg on the front arch and the rear arch including an outwardly projecting jack plate positioned for allowing jacks to engage the jack plates to raise and lower the frame superstructure off of and onto said trailer, respectively;

a translator movably mounted on the transport beam and capable of reciprocal movement along the transport beam between the forward portion and the rearward portion of the transport beam;

a lifter on the translator including a bag grabber portion capable of securely engaging a seed bag, the lifter being capable of reciprocally moving the bag grabber portion in a substantially vertical direction toward and away from the translator;

at least one hopper removably mounted on the trailer bed and disposed below the transport beam to receive seed from a seed bag positioned thereover by the lifter and translator;

at least one seed mover capable of moving seed from the hopper including a seed receiving end and a seed delivery end, the seed delivery end being positionable at a location spaced from the trailer; and a controller operatively connected to the translator, the lifter and the seed mover and capable of actuating and directing reciprocal movement of the translator along the transport beam, reciprocal vertical movement of the bag grabber with respect to the translator and operation of the seed mover between a seed delivering on condition and a seed delivering off condition.

2. An apparatus as defined in claim 1, wherein the hopper has a length and a width and the hopper length is shorter than a length dimension of said trailer bed defined between the front end and rear end of the trailer bed.

3. An apparatus as defined in claim 1, wherein the trailer bed has a width and a central longitudinal axis generally at the midpoint of the width and said at least one transport beam is aligned with the central longitudinal axis.

4. An apparatus as defined in claim 1, wherein the trailer bed further includes at least one seed bag storage station intermediate the hopper and the rear end of the trailer bed.

5. An apparatus as defined in claim 1, wherein said seed mover comprises an air delivery system.

6. An apparatus as defined in claim 1, wherein said seed mover comprises an auger delivery system.

7. An apparatus as defined in claim 1, wherein said controller for actuating and directing reciprocal movement of the translator and vertical movement of the bag grabber is hydraulically actuated.

8. An apparatus as defined in claim 1, wherein said controller is electro-mechanically actuated.

9. An apparatus as defined in claim 1, wherein said controller is manually actuated.

10. An apparatus as defined in claim 1 further including means for adjusting a flow rate of seed flowing from the hopper to a seed receiving end of the seed mover.

* * * * *